(12) United States Patent
Mai

(10) Patent No.: US 11,293,173 B2
(45) Date of Patent: Apr. 5, 2022

(54) WALL TOP FIXING DEVICE FOR EASY INSTALLATION AND DISASSEMBLY

(71) Applicant: Yangjun Mai, Huizhou (CN)

(72) Inventor: Yangjun Mai, Huizhou (CN)

( * ) Notice: Subject to any disclaimer, the term of this patent is extended or adjusted under 35 U.S.C. 154(b) by 143 days.

(21) Appl. No.: 16/805,803

(22) Filed: Mar. 1, 2020

(65) Prior Publication Data

US 2020/0291642 A1    Sep. 17, 2020

(30) Foreign Application Priority Data

Mar. 13, 2019 (CN) .......................... 201920321352.5

(51) Int. Cl.
*E04B 1/41* (2006.01)
*E04B 1/38* (2006.01)

(52) U.S. Cl.
CPC .......... *E04B 1/40* (2013.01); *E04B 2001/405* (2013.01)

(58) Field of Classification Search
CPC ...... E04B 1/40; E04B 2001/405; E04B 9/006; H04R 1/02; H04R 1/025; H04R 1/026; H04R 2201/021; F21V 21/04; F21V 21/042; F21V 21/043; F21V 21/046; F21V 21/047; F16M 13/027
USPC .................................................... 248/221.11
See application file for complete search history.

(56) References Cited

U.S. PATENT DOCUMENTS

| | | | | |
|---|---|---|---|---|
| 6,588,543 B1* | 7/2003 | Tchilinguirian | ........ | F21V 21/04 181/150 |
| 9,479,852 B2* | 10/2016 | Yang | ...................... | H04R 1/026 |
| 9,729,952 B2* | 8/2017 | Ivey | ...................... | H04R 1/026 |
| 10,024,493 B2* | 7/2018 | Hart | ...................... | H04R 1/025 |
| 10,171,897 B2* | 1/2019 | Hart | ...................... | H04R 1/025 |
| 10,563,816 B1* | 2/2020 | Mai | ...................... | H04R 1/025 |
| 10,848,844 B2* | 11/2020 | Brousseau | ............ | H04R 1/026 |
| 11,064,275 B2* | 7/2021 | Mai | ...................... | H05K 5/0226 |
| 2009/0324004 A1* | 12/2009 | Yang | ...................... | H04R 1/025 381/395 |
| 2014/0305734 A1* | 10/2014 | Ivey | ...................... | H04R 1/025 181/150 |
| 2016/0366501 A1* | 12/2016 | Ivey | ...................... | H04R 1/026 |
| 2018/0058629 A1* | 3/2018 | Hart | ...................... | H04R 1/025 |
| 2018/0063611 A1* | 3/2018 | Hart | ...................... | H04R 1/025 |
| 2019/0226637 A1* | 7/2019 | Mai | ...................... | F24F 7/007 |
| 2019/0301668 A1* | 10/2019 | Mai | ...................... | F24F 13/32 |
| 2020/0049308 A1* | 2/2020 | Mai | ...................... | F21V 21/03 |
| 2020/0077168 A1* | 3/2020 | Hart | ...................... | H04R 1/026 |
| 2020/0291642 A1* | 9/2020 | Mai | ...................... | F16B 13/0808 |

* cited by examiner

*Primary Examiner* — Christopher Garft

(57) ABSTRACT

The present invention disclose a wall top fixing device for easy installation and disassembly, which has a frame and a clamping member arranged on the frame, the frame is provided with at least one hollow foot post with column wall, the column wall is longitudinally provided with a spiral lifting chute passing through the column wall, and the clamping member passes through the spiral lifting chute and is movably sleeves in the hollow foot post, the clamping member has a foot buckle out side of the spiral lifting chute, the clamping member is rotated so that the clamping member is spirally fall down until that the foot buckle forms a clamping state with the frame.

7 Claims, 5 Drawing Sheets

WALL TOP FIXING DEVICE FOR EASY INSTALLATION AND DISASSEMBLY

TECHNICAL FIELD

The invention relates to a fixing device for fixing wall top equipment technical field, in particular, to a wall top fixing device for easy installation and disassembly.

BACKGROUND

In prior art, there are no good methods and good equipments for installing wall top equipments such as lighting, exhaust fan or ceiling horn. In order to save installation costs, springs or screws etc are directly used to mail lighting, exhaust fan or other equipments to wall top, so fixed. Alternatively, suspension or glue is used to stick these wall top equipments on wall top. When the glue is used, it takes a lot of glue to stick these wall top equipments such as lighting or other equipments on wall top. The installation is inconvenient, difficult to operate, the consumption of manpower is large. And the viscosity of the glue will decrease with time to affect the installation stability. And once lighting or other equipments have some problems and need to be repaired, it is extremely inconvenient to remove. Therefore, it is necessary to design a wall top fixing device for easy installation and, disassembly to solve the defects in the existing technology.

SUMMARY

In order to resolve the above defects in the existing technology, the present invention disclose a wall top fixing device for easy installation and disassembly, which has the advantages of easy installation and disassembly, easy operation.

The technical proposals of the present invention are as follows:

A wall top fixing device for easy installation and disassembly has a frame and at leas one clamping member arranged on the frame, the frame is provided with at least one hollow foot post with a column wall, the column wall is longitudinally provided with a spiral lifting chute passing through the column wall, and the clamping member passes through the spiral lifting chute and is movably sleeved in the hollow foot post, the clamping member has a foot buckle outside of the spiral lifting chute, the clamping member is rotated so that the clamping member spirally falls down until that the foot buckle forms a clamping state with the frame.

The clamping member includes a loop, the loop is movably sleeved to the spiral lift chute, the loop partially extends towards its loop center at its inner wall to form a first connecting column, the first connecting column vertically extends to form a knob block, the first connecting column passes through the spiral lifting chute and the knob block is placed in the hollow foot post.

The knob block is provided with a knob part at its bottom.

The loop partly extends outward at its outer wall to form a second connecting column, the second connecting column is provided with the foot buckle.

The spiral lifting chute has a first chute, the first chute extends spirally upward to form a second chute, and the second chute extends upward to form a third chute.

The frame is provided with at least one fixing member and at least one hollow mounting column, the fixing member is installed at the hollow mounting column.

The fixing member includes a knob rod with opposited opposite two ends and a fixing block. The knob rod is provided with a knob at its one end, the knob rod is provided with a clamping part at its the other end, the knob rod is inserted into the hollow mounting column, the clamping part is exposed and the fixing block is connected to the knob rod through the clamping part.

The present invention has the follow advantages: The wall top fixing device for easy installation and disassembly provides a frame, at least one clamping member and at least one fixing member, the clamping member and the fixing member are arranged on the frame. When installing, it is necessary to reserve a hole in the wall top, worker rotates the clamping member and the fixing member to fix the clamping member in a clamping state with the frame, thus the wall top fixing device for easy installation and disassembly is fixed to the wall top. When disassembled, the fixing member is reversely rotated, the clamping state of the foot buckle with the frame is released, and the clamping member is reversely rotated to achieve the disassembly. The installation and disassembly of the wall top fixing device are convenient and easy to operate.

DETAILED DESCRIPTION OF EMBODIMENTS

In order to make the invention purpose, the technical scheme and the technical effect are more clearly understood, and the invention is further explained in combination with the concrete embodiment below. It should be understood that the specific embodiments described herein are only used to interpret the invention and are not used to qualify the invention.

Figure 1:
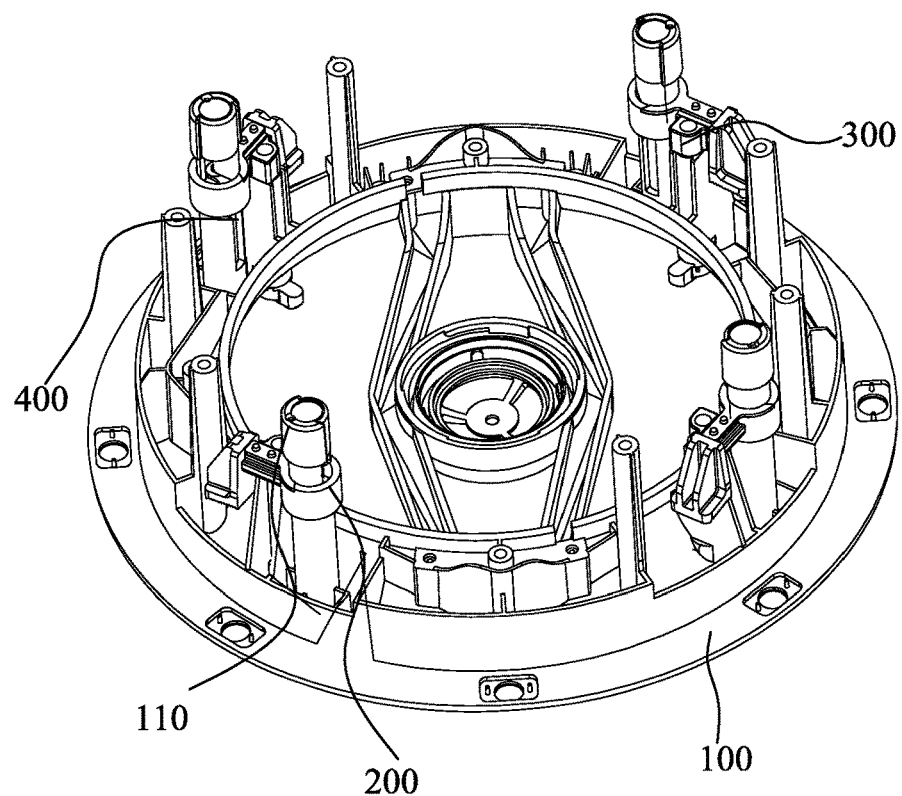
FIG. 1 shows a view from its top of the wall top fixing device for easy installation and disassembly according to the present invention.
Figure 2:
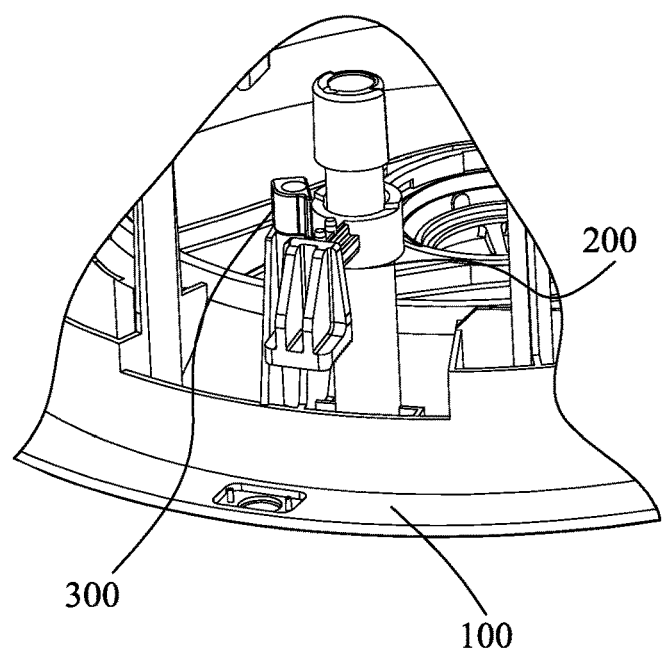
FIG. 2 shows a local structure view of the clamping state of the clamping member and the frame according to the present invention.
Figure 3:
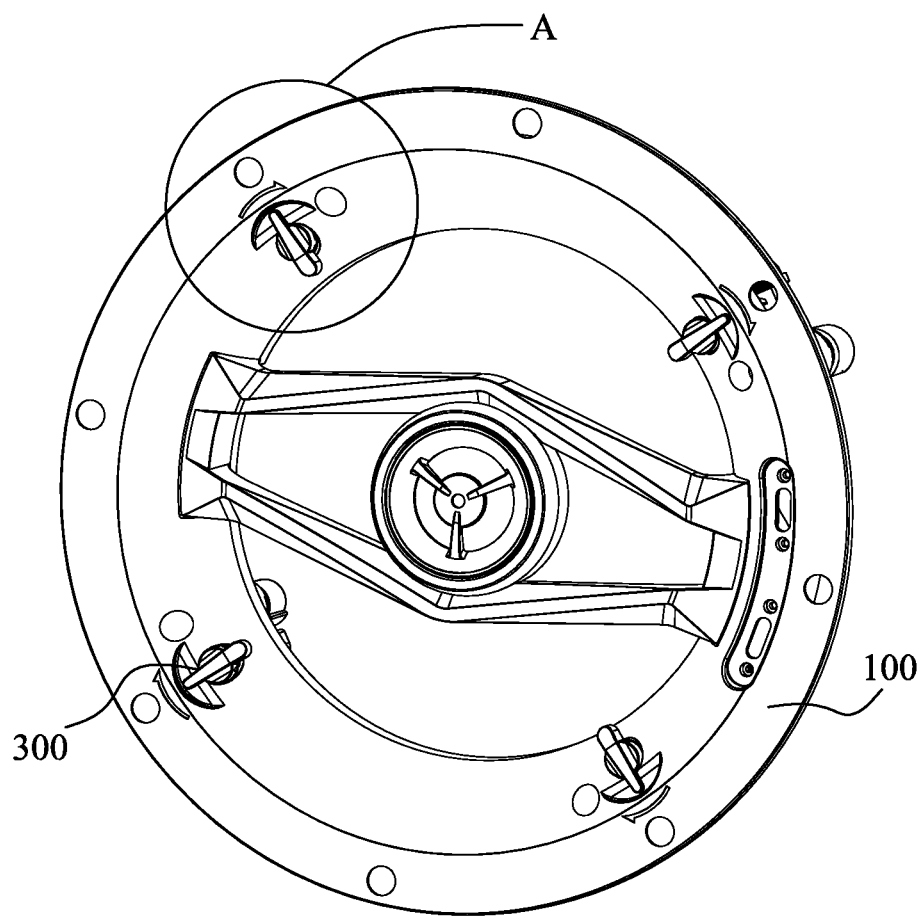
FIG. 3 shows the other view from its bottom of the wall top fixing device for easy installation and disassembly according to the present invention.

Referring to FIG. 1 and FIG. 2, a wall top fixing device for easy installation and disassembly has a frame 100, at least one clamping member 200 and at least one fixing member 300. The clamping member 200 and the fixing member 300 are arranged on the frame 100. The frame 100 is provided with at least one hollow foot post 110 with a column wall, the column wall is longitudinally rrovided with a spiral lifting chute 400 passing through the column wall. The clamping member 200 passes through the spiral lifting chute 400 and is movably sleeved in the hollow foot post 110. The fixing member 300 movably passes through the frame 100 and is embedded in it. When installing, the wall top is reserved a hole, the clamping member 200 is rotated to fall dwon along the spiral lifting chute 400, the fixing member 300 is rotated to fix the clamping member 200 in the spiral lifting chute 400. At this time, the clamping member 200 is in a clamped state with the frame 100, thus the wall top fixing device for easy installation and disassembly can be fixed to the wall top. When disassembled, the fixing member 300 is reversely rotate to release the clamping state between the clamping member 200 and the frame 100, and the clamping member 200 is rotated again to complete the disassembly. With these structure design, the operation of the installation and disassembly is simple and extremely convenient. In the present embodiment, both of the number of the clamping member 200 and that of the fixing member 300 are 4. It should be understood that in the present invention, the quantity of the clamping member 200 and the fixing member 300 are not limited as long as it can be achieved to fix the the wall top fixing device for easy installation and disassembly on the wall top.

Figure 4:
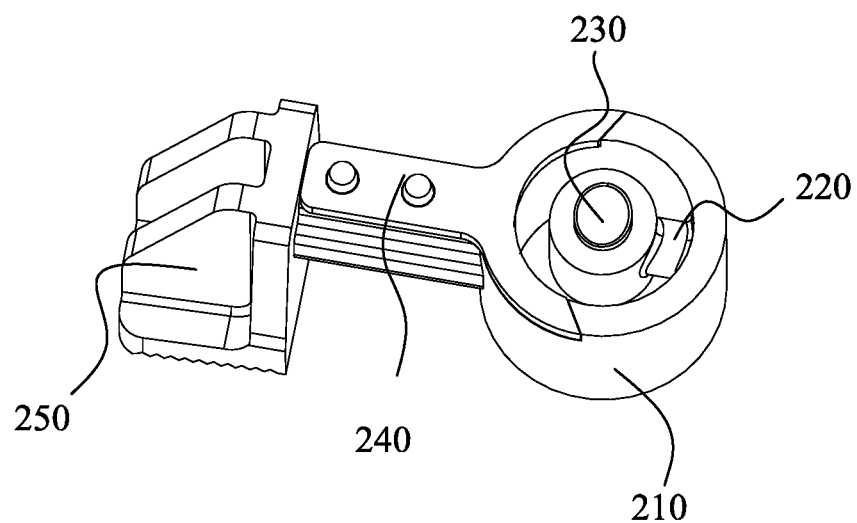
FIG. 4 shows a view from its top of the clamping member according to the present invention.
Figure 5:
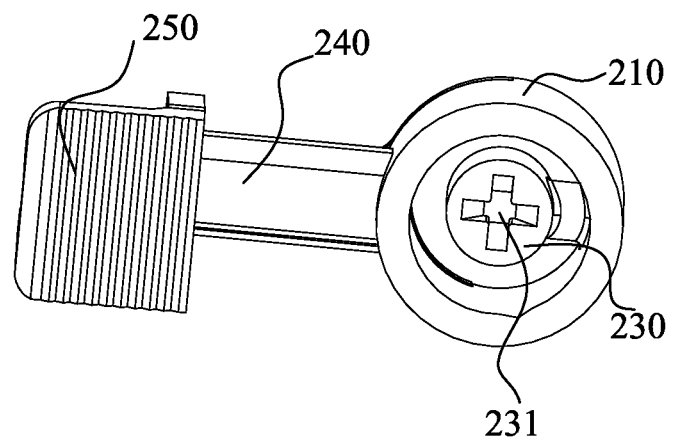
FIG. 5 shows a view from its bottom of the clamping member according to the present invention.
Figure 6:
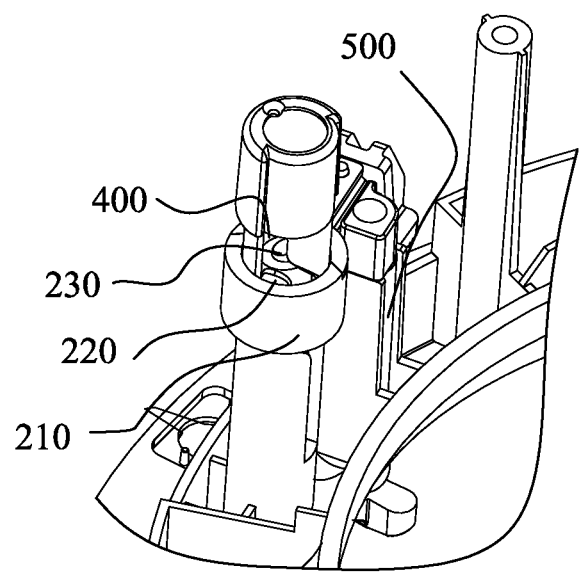
FIG. 6 shows a view of the combination structure of the clamping member and the hollow foot post.

Further, referring to FIG. 4, FIG. 5 and FIG. 6, the clamping member 200 includes a loop 210, the loop 210 is movably sleeved at the out side of the spiral lifting chute 400. The loop 210 has inner wall and outer wall, the inner wall of the loop 210 partially extends towards the loop center to form a first connecting column 220, the first connecting column 220 vertically extends to form a knob block 230, the knob block 230 is provided with a knob part 231 at its end. The first connecting column 220 passes through the spiral lifting chute 400 and the knob block 230 is placed in the hollow foot post 110. Its outer wall of the loop 210 partly extends outward to form a second connecting column 240. The second connecting column 240 is provided with the foot buckle 250 at its end. In the the embodiment, the knob part 231 has a cross thread, and with a hand-held cross screwdriver, the clamping member 200 can be rotated through the cross thread. It should be noted that the shape of the knob part 231 is not limited in the present invention. The knob part 231 may also be a part that can be manually rotated, the shape of the knob part 231 can only be satisfied if the clamp member 200 can be driven to slide along the spiral lifting chute 400 through the knob part 231.

Figure 7:
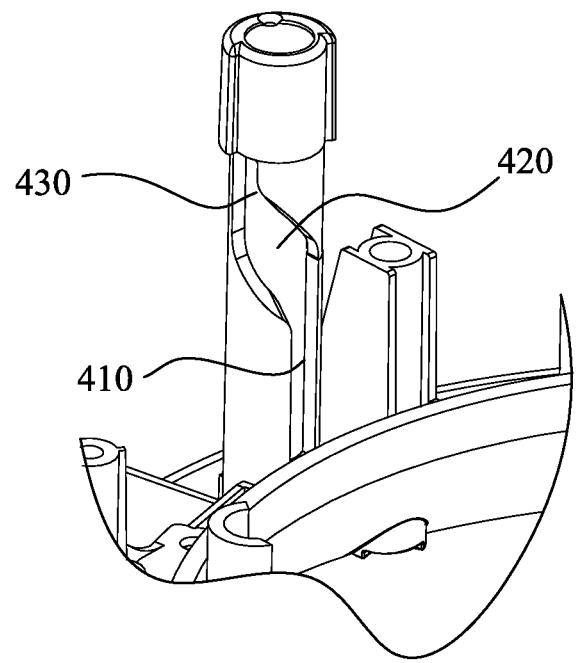
FIG. 7 shows a view of the spiral lifting chute according to the present invention.

Referring to FIG. 6 and FIG. 7, the spiral lifting chute 400 has a first chute 410, the first chute 410 extends spirally upward to form a second chute 420, and the second chute 420 extends upward to form a third chute 430. In the embodiment, the second chute 420 is arranged in a spiral shape, the first chute 410 and the third chute 430 are arranged in a vertical shape respectively. The second chute 420 is arranged in a spiral shape that enables the clamping member 200 to slide down along the second chute 420, at the same time to change the relative position of the foot buckle 250 with the frame 100. When the clamping member 200 rotates to between the bottom of the second chute 420 and the top of the first chute 410, it is fixed with the fixing member 300, the clamping member 200 forms a clamping state with the frame 100, thus the the wall top fixing device for easy installation and disassembly can be fixed to the wall top. It should be noted that the shape of the first chute 410, the second chute 420 and the third chute 430 are not limited to the above description, their shape can only be satisfied if the clamping member 200 has been spirally fall down to form a clamping state with the frame 100.

Figure 8:
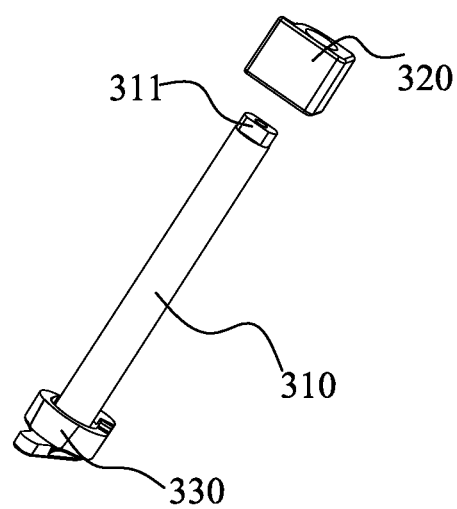
FIG. 8 shows a view of the decomposition structure of the fixing member according to the present invention.
Figure 9:
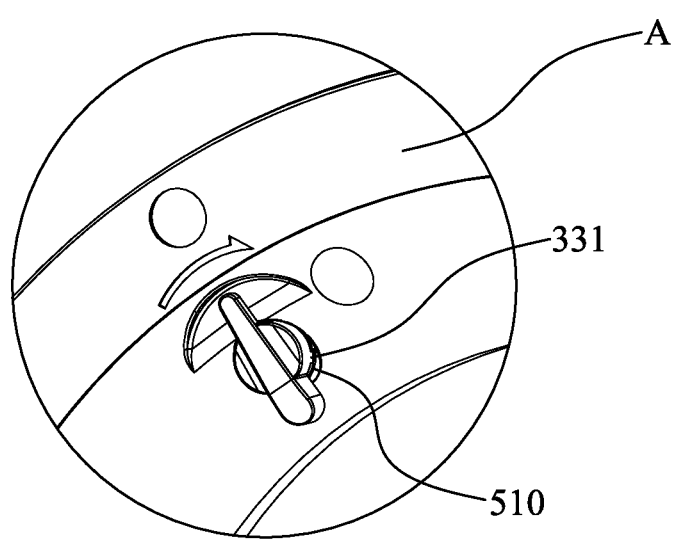
FIG. 9 shows an enlarged view of the A in FIG. 3.

Referring to FIG. 8 and FIG. 9, the frame 100 is provided with at least one hollow mounting column 500, the fixing member 300 is installed at the hollow mounting column 500.

Further, the fixing member 300 includes a knob rod 310 with opposite two ends and a fixing block 320. One end of the knob rod 310 is provided with a knob 330, the other end of the knob rod 310 is provided with a clamping part 311. The knob rod 310 is inserted into the hollow mounting column 500 and the clamping part 311 is exposed, and the fixing block 320 is connected to the knob rod 310 through the clamping part 311. When the clamping member 200 drops to the bottom of the second chute 420, the knob 330 is rotated to drive the fixing block 320 to rotate, so that the fixing block 320 is in contact with the second connecting column 240, thus playing the role of the fixing member 300 to fix the clamping member 200 within the spiral lifting chute 400.

Further, referring to FIG. 9, the hollow mounting column 500 is provided with a limiting slot 510 at its bottom, the knob 330 is provided with a limit convex block 331 matching the limiting slot 510.

The working principle of the wall top fixing device for easy installation and disassembly is as follows: when installing, it is necessary to reserve a hole in wall top, worker lifts the wall top fixing device for easy installation and disassembly to the frame 100 in contact with one side of the wall top at the hole, then the worker rotates the clamping member 200 to spirally fall down along the second chute 420 to its bottom, then the worker rotates the fixing member 300 to fix the foot buckle 250 at the other side of the wall top. At this point, the foot buckle 250 is in a clamping state with the frame 100, thus the wall top fixing device for easy installation and disassembly is fixed to the wall top. When disassembled, the fixing member 300 is reversely rotated, the clamping state of the foot buckle 250 with the frame 100 is released, and the clamping member 200 is reversely rotated, so that the clamping member 200 spirally rise to the second chute 420, and, the worker manually holds the wall top fixing device for easy installation and disassembly to remove it.

The above contents are the further detailed explanation of the present invention in combination with the concrete optimal selection and implementation mode. For the general technical personnel in the technical field of the present invention, the structure form can be flexible and changeable, and the series, products can be derived without being separated from the practical new conception. A number of simple deductions or substitutions shall be deemed to belong to the scope of patent protection determined by the filed claims of the present invention.

The invention claimed is:

1. A wall top fixing device for easy installation and disassembly includes a frame and at least one clamping member arranged on said frame, wherein said frame is provided with at least one hollow foot post with a column wall, said column wall is longitudinally provided with a spiral lifting chute passing through said column wall, and said clamping member passes through said spiral lifting chute and is movably sleeved in said hollow foot post, said clamping member has a foot buckle outside of said spiral lifting chute, said clamping member is rotated so that said clamping member spirally falls down until that said foot buckle forms a clamping state with said frame;

wherein said clamping member includes a loop, said loop is movably sleeved in said spiral lift chute, said loop partially extends towards its loop center at its inner wall to form a first connecting column, said first connecting column vertically extends to form a knob block, said first connecting column passes through said spiral lifting chute and said knob block is placed in said hollow foot post.

2. The wall top fixing device for easy installation and disassembly according to claim 1, wherein said knob block is provided with a knob part at its bottom.

3. The wall top fixing device for easy installation and disassembly according to claim 1, wherein said loop partly extends outward to form a second connecting column at its outer wall, said second connecting column is provided with said foot buckle at its end.

4. The wall top fixing device for easy installation and disassembly according to claim 1, wherein said spiral lifting chute has a first chute, said first chute extends spirally upward to form a second chute, and said second chute extends upward to form a third chute.

5. The wall top fixing device for easy installation and disassembly according to claim 1, wherein said frame is provided with at least one fixing member and at least one hollow mounting column, said fixing member is installed at said hollow mounting column.

6. The wall top fixing device for easy installation and disassembly according to claim 5, wherein said fixing member includes a knob rod with opposite two ends and a fixing block, one end of said knob rod is provided with a knob at its one end, said knob rod is provided with a clamping part at its other end, said knob rod is inserted into said hollow mounting column, said clamping part is exposed and the fixing block is connected to said knob rod through said clamping part.

7. The wall top fixing device for easy installation and disassembly according to claim 6, wherein said hollow mounting column is provided with a limiting slot at its bottom, said knob is provided with a limit convex block matching said limiting slot.

\* \* \* \* \*